March 29, 1960     E. S. McVEY     2,930,905
RELAXATION OSCILLATOR AND INTEGRATOR
Filed July 30, 1957
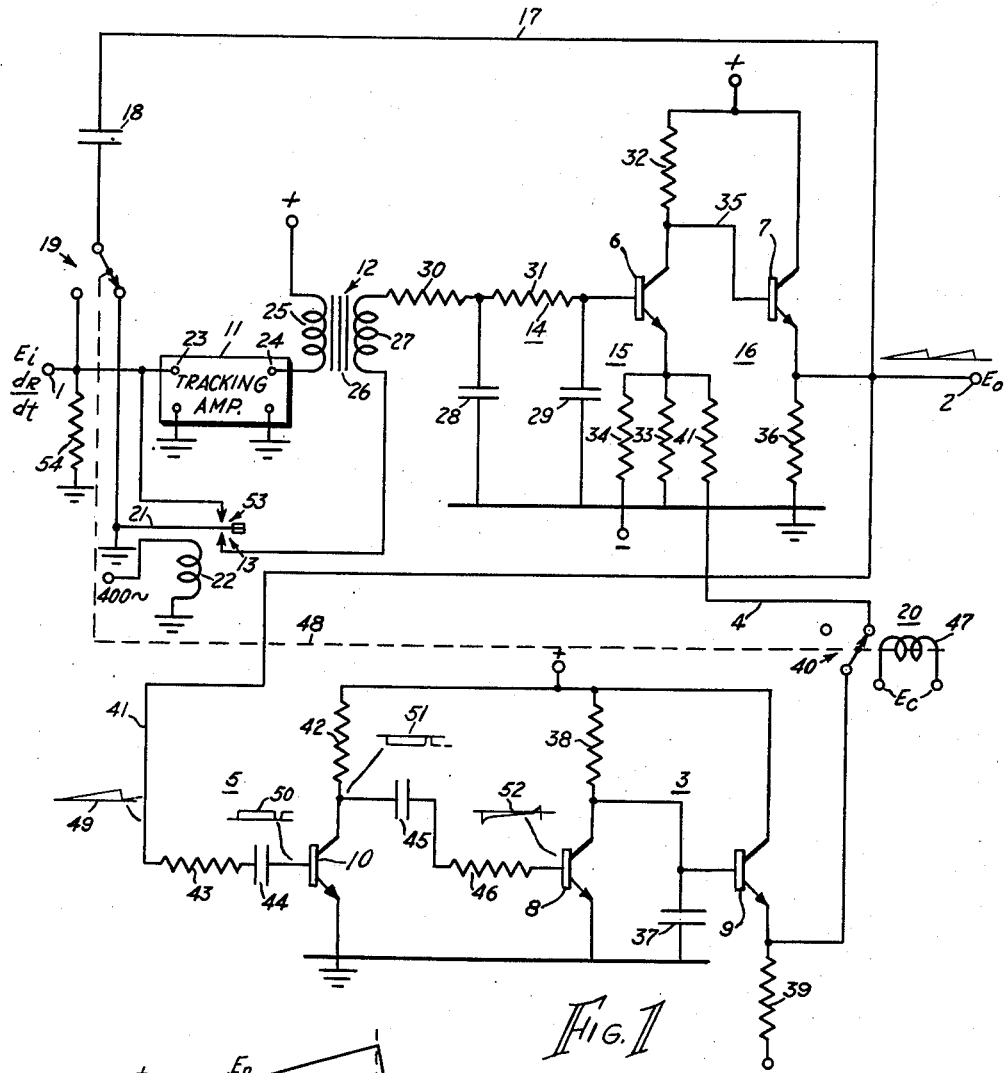
Fig. 1
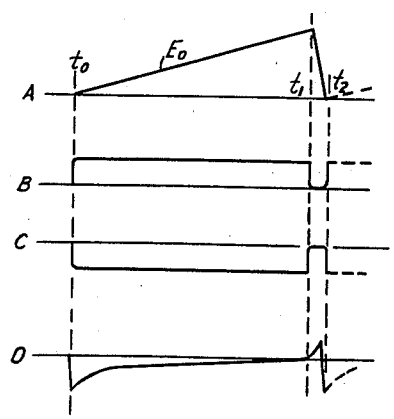
Fig. 2
INVENTOR.
EUGENE S. McVEY
BY
ATTORNEYS

United States Patent Office 2,930,905
Patented Mar. 29, 1960

2,930,905

RELAXATION OSCILLATOR AND INTEGRATOR

Eugene S. McVey, Fort Wayne, Ind.

Application July 30, 1957, Serial No. 675,234

10 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

This invention pertains to apparatus having a first mode of operation for generating oscillations and a second mode of operation for integrating a direct-current signal. These functional attributes make the invention especially useful, for example, in the radar range units of radar systems which automatically and continuously produce an indication of the instantaneous range to a reflecting object, or target, moving within the radar beam. As applied in a radar range unit, sawtooth oscillations produced in the first operating mode assist in "finding" the target in range. Once range acquisition is effected, the second operating mode begins and a direct-current signal representing the rate of change of range is converted to a signal representative of range.

In accordance with this invention, an electrical charge-discharge channel is coupled in series with an amplifier which comprises at least one or more stages of a Miller-type integrator. A portion of the amplifier output signal is fed back regeneratively to the input terminal of the charge-discharge channel to establish self-triggered oscillations. When an embodiment of the invention is in condition for the first mode of operation, the feedback loop of the integrator is coupled to a source of constant reference potential, the input terminal of the charge-discharge channel is coupled to the output terminal of the amplifier, and the input terminal of the amplifier is coupled to the output terminal of the charge-discharge channel. Thus, the integrating function is precluded and cyclic operation of the charge-discharge channel is initiated and proceeds under the control of a portion of its amplified output signal. When an embodiment of the invention is in condition for the second mode of operation, the feedback loop of the integrator is coupled again to an input terminal of the amplifier and the charge-discharge channel is disabled by interrupting its output circuit. As a result, oscillations cease, the integrating function is resumed, and the output signal of the amplifier represents the integral of its direct-current input signal. A relay operative in response to a control signal may effect the simple circuit alterations required to change from one mode of operation to the other. According to an important feature of the invention and for reasons which will become more apparent hereinafter, semiconductors are used in its amplifying, electronic switching, and impedance-matching circuitry.

In modern radar systems it is commonplace to provide apparatus for causing the directional radar beam to follow, or track, a moving target automatically. This function is called a tracking procedure. In addition to beam pointing, the tracking procedure of many modern radar systems also involves range gating, a function which automatically and continuously maintains the target within the boundaries of a range gate. As used herein, the term, gating, means switching on or off for a predetermined time interval. The phrase, range gating, therefore, means that one or more of the circuits associated with the radar receiver is turned on or off only during the range gate. The phrase, range gate, denotes the portion of the time interval between transmitted pulses which corresponds to a preselected segment of the operating range of the system. A target is gated in range, therefore, whenever a radar signal reflected from the target arrives at the receiver during the range gate; that is, during the comparatively brief portion of the interpulse time interval that the gate-controlled circuit is gated on. One of the principal reasons for using range gates is to obtain more accurate representations of the instantaneous range to a target.

Inasmuch as the time duration of a range gate corresponds only to a small segment of the operating range of a radar system, usually a few feet or yards at most, the time at which the gate occurs during the interpulse interval must be varied in accordance with the changing range of a gated target so that the time of arrival of the radar signal reflected from the target will continue to occur during the gate interval. This function is called range tracking. In modern radar systems the range tracking requirement is fulfilled by circuitry usually included in the radar range unit. This unit also may include circuitry for generating and sweeping the range gate automatically through the total operating range until the target is acquired. The last function is called range searching or target acquisition in range. It occurs automatically whenever the circuit is in its ungated condition; that is, whenever a target return signal, if any, does not arrive during the time the gate occurs. At the instant a target is gated, however, the search function ceases and range tracking begins automatically. If a gated target becomes ungated for any reason, the search function will be resumed automatically and will continue until the target is once more within the gate.

To effect automatic range searching and tracking, it is conventional practice to include circuitry in the range unit for generating a range gate signal in response to a signal representing the instantaneous range to the target. Hence, the time of occurrence of the range gate is determined by the time of arrival of the signal returned from the target. It is conventional also to accomplish range search by generating an artificial range signal within the radar range unit. This signal may have a linearly-changing magnitude throughout the interpulse interval. A relaxation oscillator producing an output signal of sawtooth waveform may be utilized as the range signal source.

The artificial range signal causes the range gate generator to produce range gates at times changing linearly with respect to each preceding radar pulse. This action, in effect, repetitively moves the range gate through the entire operating range. Thus, if a target is present within the effective cross section of the radar beam and is within the operating range of the system, the range gate eventually will occur at a time corresponding to the actual range to the target. When this is the case, the radar signal returned from the target passes through the range gate, causes the relaxation oscillator to cease producing the artificial range signal, and couples a range-rate signal to an integrator circuit where it is translated into a signal representative of instantaneous target range. Thereafter, the time of occurrence of the range gate is controlled by the radar return signal itself.

The range rate signal may be developed by a discriminator which compares two samples of the returned radar signal taken respectively from the beginning and end of the range gate in order to produce a direct-current error potential having a magnitude proportional to the displacement of the target return signal from the center of the gate and a polarity indicative of the direction of the displacement. This error potential also is proportional to range rate and, as such, may constitute the range rate signal supplied to the integrator.

A relaxation oscillator-integrator in accordance with this invention is applicable especially to supply the artificial range signals required for the range search function and, upon acquiring a target in range, for integrating the range rate signal to produce a signal representative of instantaneous target range.

Although automatic range-search and range-rate integrator apparatus is known in the art, it has been customary to provide separate and independent circuits for generating range-search signals and for integrating range-rate signals. Moreover, the circuitry required for these functions has involved the use of heavy components such as vacuum tubes, coupling transformers, and filament power supplies, a factor which considerably increases the weight of radar range units and constitutes an undesirable and sometimes serious limitation on the power output-to-weight ratio of an airborne radar system.

The relaxation oscillator and integrator circuit of this invention materially alleviates the aforementioned disadvantages. These improvements are attributable, primarily, to an ingenious circuit configuration which makes it possible to utilize the same amplifier channel both for integrating a direct-current input signal representing a differential quantity and for amplifying sawtooth oscillations to a usable amplitude. In addition, other novel and important features of the invention such as reduced weight, minimized circuit complexity, and increased reliability may be attributed primarily to the use of semiconductors as amplifying, switching, and impedance-matching elements.

It should be apparent, therefore, that some typical objects of the invention are:

(1) To provide a relaxation oscillator and integrator circuit.

(2) To provide apparatus operating as a relaxation oscillator in one, and a Miller-type integrator in a second, mode of operation.

(3) To provide a relaxation oscillator and integrator circuit which is applicable especially in the radar range units of airborne radar systems for developing a range-search signal or, alternatively, integrating a direct-current input potential representing range rate to produce an output signal representing the instantaneous range to a target.

(4) To provide a composite circuit for generating oscillations in a first, and for integrating a differential quantity in a second, mode of operation.

(5) To provide a relaxation oscillator and integrator wherein an amplifier comprising at least a portion of an integrating circuit also is utilized in a relaxation oscillator circuit.

(6) To provide a relaxation oscillator and integrator comprising an amplifier channel having a degenerative feedback loop including a storage capacitor for integrating a direct-current potential representing a differential quantity, an electrical charge-discharge channel coupled in series to the input terminal of an amplifier made up of one or more cascaded stages of the amplifier channel, and a regenerative feedback circuit coupling the output terminal of the amplifier to the input terminal of the charge-discharge channel.

(7) To provide a semiconductor circuit for generating oscillations or, alternatively, for integrating a differential quantity.

(8) To provide a composite relaxation oscillator and integrator wherein amplifying, switching, and impedance-matching circuitry is comprised of semiconductors.

(9) To provide a composite circuit having a first structural configuration operative as a self-triggered relaxation oscillator, a second structural configuration operative as a Miller-type integrator, and means responsive to a control signal for establishing selectively the first or second structural configuration.

(10) To provide apparatus of superior economy, minimum weight, maximum reliability, and engineering simplicity for effectuating any of the aforesaid objects.

In general, an exemplary embodiment of the invention may comprise a semiconductor amplifier channel having signal input and output terminals, a degenerative feedback loop including a first storage capacitor coupled between the signal output and input terminals of the amplifier channel to form a Miller-type integrator, a second storage capacitor coupled between a source of charging potential and a source of constant reference potential and a semiconductor switch coupled across the second storage capacitor to form an electrical charge-discharge channel, means coupling a signal output terminal of the charge-discharge channel to a signal input terminal of one or more cascaded stages of the amplifier channel, means including wave-shaping means regeneratively feeding back a portion of the voltage at the signal output terminal of the cascaded stages to the input terminal of the charge-discharge channel in order to operate the semiconductor switch to discharge the second storage capacitor periodically and establish, thereby, an operating mode wherein the circuit functions as a self-triggered relaxation oscillator, and means such as a relay normally maintaining the circuit in a relaxation-oscillator configuration whereby the storage capacitor of the integrator feedback loop is coupled to a source of constant reference potential, but operative in response to a control signal to alter the circuit configuration to that of a Miller-type integrator whereby the charge-discharge channel is decoupled from the amplifier channel and the storage capacitor of the integrator feedback loop is coupled to the signal input terminal of the amplifier channel.

The amplifier channel of the exemplary embodiment may comprise a signal input terminal, a chopper for transforming a direct-current input potential into an alternating-current potential, a tracking amplifier tuned to the chopper frequency and coupled to the chopper, a second chopper for rectifying the output signal of the tracking amplifier, a smoothing filter for smoothing the rectified output of the second chopper, a first semi-conductor amplifying stage coupled to the smoothing filter, a first semiconductor impedance-matching stage coupled to the first amplifying stage, a storage capacitor coupled to the signal output terminal of the first impedance-matching stage, and a first set of relay contacts for coupling the storage capacitor selectively to the input terminal of the amplifier channel or to a source of constant reference potential.

To form the relaxation oscillator, the electrical charge-discharge channel and its associated circuitry comprises a second storage capacitor and a resistor coupled in series between a source of charging potential and a source of constant reference potential, a semiconductor switching circuit coupled across the second storage capacitor, a second semiconductor impedance-matching stage coupled between the storage capacitor and an input terminal of the first semiconductor amplifying stage, a wave-shaping circuit made up of a second semiconductor amplifier coupled via resistance-capacitance differentiator networks between the signal output terminal of the amplifier channel and the input terminal of the semiconductor switch, and a second set of relay contacts for completing or interrupting the circuit between the second semiconductor impedance-matching stage and the input terminal of the first semiconductor amplifier.

In its first mode of operation, the exemplary embodiment functions as a relaxation oscillator. Assume that the storage capacitor in the charge-discharge channel is charging. As the charge accumulates in the storage capacitor, the potential difference across its plates increases.

This increasing potential passes via the second semiconductor impedance-matching stage to the first semiconductor amplifier. After amplification, the increasing potential passes through the first impedance-matching stage to the amplifier output terminal.

To develop the discharge potential for operating the semiconductor switch of the charge-discharge channel, a portion of the potential developed at the output terminal passes, through a resistance and capacitance which in cooperation with the impedance of the second semiconductor amplifier constitute a first differentiator network where its waveform undergoes a first modification and amplification. After amplification, the waveform undergoes further modification in a second similarly constituted differentiator network which includes the semiconductor switch.

This last waveform modification completes the process through which a portion of the potential at the amplifier output terminal is converted into a suitable discharge potential for the semiconductor switch. Thus, when the discharge potential becomes sufficient in magnitude, the semiconductor switch closes to form a conductive path to ground for the electrical charge accumulated on the storage capacitor. During the ensuing discharge, a portion of the decreasing potential at the amplifier signal output terminal is fed back regeneratively through the aforesaid second amplifier and differentiator networks to the semiconductor switch, producing current saturation therein and causing it to open again very rapidly. The switch then remains open while the storage capacitor is recharging and the discharge potential again becomes great enough to close it. The self-controlled, repetitive charge-discharge cycles, established in this manner, constitute the source of the oscillatory signal developed at the amplifier output terminal.

When, for example, a target is acquired in range, a control signal is developed which actuates the relay, thereby restoring the integrator feedback loop and disconnecting the charge-discharge channel from the first semiconductor amplifier. As a result, the relaxation oscillations cease, and the amplifier channel operates as a typical Miller integrator.

The foregoing summary of the invention and statement of its objects are intended merely to assist in developing an understanding and appreciation of its principal features, not to restrict its scope. It is probable that additional objects and features will become apparent after reference to the following detailed description made in conjunction with the accompanying drawings wherein:

Fig. 1 is a block-schematic representation of an exemplary embodiment of the invention, and Fig. 2 represents the time relationship between idealized waveforms which may occur at various points in the circuit of Fig. 1.

All five semiconductors utilized in the exemplary embodiment of Fig. 1 are transistors. As is well understood in the art, semiconductive bodies are characterized by two types of conductivity, a first type wherein the principal current carriers are electrons, and a second type wherein the predominant current carriers are holes. Semiconductor material of the first type may be designated a doNor or N-type material. A semiconductor material of the second type is normally designated acceptor or P-type material. Thus, when N-type and P-type materials are juxtaposed such that a P–N junction is formed, the excess electrons from the N region tend to traverse the junction and pass into the P region. This process normally is inhibited by a potential barrier which is developed at the junction between the two regions. When a potential from an external source is applied in such a direction as to overcome the natural potential barrier of the junction, more of the electrons of the N region and the holes of the P region traverse the junction and current flow occurs. A transistor normally comprises a semiconductor body having at least one zone of a first conductivity type sandwiched between two regions of an opposite conductivity type such that two junctions are formed. Thus, a P–N–P transistor will have a middle region of N-type semiconductive material and end regions of P-type semiconductive material, and an N–P–N transistor will have a middle region of P-type and end regions of N-type semiconductive material. For a more complete treatise on transistor theory and circuit design, the practitioner may refer to the following publications: Electrons and Holes in Semi-Conductors, by W. Shockley, D. Van Nostrand Company, 1950; Transistor Electronics, by Lo, Endres, Zawels, Waldhauer, and Cheng, Prentice Hall, 1955; and Some Circuit Properties and Applications of N–P–N Transistors, by R. L. Wallace, Jr., and W. J. Pietenpol, volume 39, Proceedings of the IRE, July 1951, page 753, et seq.

Although the transistors used in the exemplary embodiment of Fig. 1 are of the N-P-N type coupled in the grounded-emitter configuration, it should be understood that embodiments of the invention also may be designed utilizing P-N-P transistors coupled in the same or other configurations. To effect the substitution of P-N-P for N-P-N transistors utilizing the grounded-emitter configuration of Fig. 1, it would be necessary merely to reverse the polarities of the biasing potentials, a change which would entail the use of no more design skill than that of an ordinary mechanic in the art.

Inasmuch as the base biasing circuits utilized in the exemplary embodiment of Fig. 1 are conventional and, as such, form no part of the subject invention, their inclusion in the schematic would constitute a source of possible confusion and complexity. Accordingly, the drawings have been simplified by their omission.

In general, the exemplary relaxation oscillator-integrator of Fig. 1 comprises a Miller-type integrating circuit wherein an amplifier channel and a degenerative feedback loop are coupled in parallel between input terminal 1 and output terminal 2 for integrating a direct-current input signal, a charge-discharge channel 3 having its output coupled to an intermediate point in the amplifier channel via conductor 4, and a regenerative feedback channel 5 coupled between output terminal 2 and the input to the charge-discharge channel. In the amplifier channel semiconductor 6 operates as a direct-current amplifier, and semiconductor 7, coupled in the common collector configuration, functions as an impedance-matching transformer between the high impedance output of semiconductor 6 and the low impedance loads coupled to output terminal 2. The semiconductors 8 and 9 of charge-discharge channel 3 operate as an electronic switch and impedance-matching transformer, respectively. The semiconductor 10 in the regenerative feedback circuit 5 operates as a conventional signal amplifier.

The amplifier channel comprises an input terminal 1, a first chopper 53 coupled to the input terminal for converting an input signal of unidirectional potential into an alternating-current signal, a tracking amplifier 11 coupled to chopper 53 for increasing the A.-C. signal to a usable level, an impedance-matching transformer 12 coupled to the output of tracking amplifier 11, a second chopper 13 coupled to the output transformer for rectifying the A.-C. signal, a smoothing filter 14 coupled to transformer 12 for minimizing fluctuations in the rectified signal, a semiconductor amplifier 15 coupled to the filter 14 for increasing the magnitude of the direct-current signal, and a semiconductor impedance-matching stage 16 for coupling the unidirectional output signal to low impedance loads which may be coupled to output terminal 2. A degenerative feedback loop made up of conductor 17 and storage capacitor 18 coupled between output terminal 2 and input terminal 1 cause the unidirectional output potential to represent the integral of the input signal. The single-pole, double-throw contacts 19 of relay 20 make it possible to couple the storage capacitor 18 of the degenerative feedback loop either to a ground source of constant potential or to the input terminal 1 of the amplifier channel. When the storage capacitor 18 is coupled to the ground source of constant potential, the feedback loop is disabled and the integrating function is substantially suppressed. On the other hand, when the storage capacitor 18 is coupled to the input terminal 1 of the amplifier channel, the feedback loop is enabled and the integrating function is resumed.

The input circuit of the amplifier channel comprises the input terminal 1 and resistor 54 coupled between terminal 1 and a ground source of constant potential. The chopper 53 has a reed 21 driven electromagnetically by coil 22 which is coupled between a 400-cycle source and a ground source of constant potential.

The tracking amplifier 11 may comprise any conventional amplifier for increasing the A.-C. signal output of chopper 53 to a usable amplitude. For example, the tracking amplifier 11 may comprise one or more semiconductor amplifying stages having interstage coupling transformers tuned to the 400-cycle signal frequency. Transformer coupling may be preferred in order to provide optimum impedance-matching between stages and to increase the overall stability of the amplifier channel. The tracking amplifier may be tuned to the 400-cycle input frequency to eliminate any spurious frequency components which may be present in the A.-C. output signal of chopper 53.

The coupling transformer 12 has a primary winding 25 coupled between a source of positive potential and the output terminal 24 of tracking amplifier 11, a core element 26, and a secondary winding 27 in series with chopper 13 and the input of filter 14. The chopper 13 is similar in all respects to chopper 53 and also may be driven electromagnetically by coil 22 energized by the 400-cycle source of alternating-current voltage. The function of chopper 13 is to rectify the alternating-current output of the tracking amplifier 11 induced in the secondary winding 27 of coupling transformer 12. The choppers 53 and 13, for example, may comprise any externally driven, dual contact unit. Alternatively, electronic choppers may be used in lieu of mechanical choppers 53 and 13.

The smoothing filter 14 is a conventional pi-type resistance-capacitance network made up of series-connected resistors 30 and 31, a shunting capacitor 28 coupled between a point common to resistors 30 and 31 and a ground source of constant potential, and shunting capacitor 29 coupled between the opposite end of resistor 31 and a ground source of constant potential.

The semiconductor amplifier stage 15, coupled to the smoothing filter 14, receives the unidirectional signal therefrom and increases it to a suitable magnitude. This stage is comprised of N-P-N transistor 6 having its emitter-to-collector path coupled in series with load resistor 32 and emitter resistor 33 between a source of positive potential and a ground source of constant reference potential. The unidirectional output signal from filter 14 is applied to the base electrode of the transistor. A source of negative biasing potential is applied through resistor 34 to the emitter electrode.

After amplification by amplifier 15, the signal passes via conductor 35 to the base electrode of the semiconductor impedance-matching stage 16. This stage comprises N-P-N transistor 7 coupled in series with emitter load resistor 36 between a source of positive potential and a ground source of constant reference potential. The output signal $E_o$, developed across resistor 36 of the low impedance output circuit, then passes to the amplifier output terminal 2. The operation of the amplifier channel in the integrator circuit configuration will be set forth below.

The relaxation oscillator configuration of the exemplary embodiment comprises the charge-discharge channel 3, semiconductor amplifier 15, semiconductor impedance-matching stage 16, and the regenerative feedback circuit 5. In this circuit configuration, the integrating function is reduced substantially by grounding the storage capacitor 18 of the degenerative feedback loop through contacts 19 of relay 20.

The charge-discharge channel 3 comprises a storage capacitor 37 coupled in series with resistor 38 between a source of positive potential and a ground source of constant reference potential for accumulating an electrical charge, an N-P-N transistor 8 coupled in parallel with the storage capacitor 37 for discharging the accumulated electrical charge at the end of each charging interval, and an N-P-N transistor 9 coupled in the common collector configuration for lowering the effective output impedance of the charge-discharge channel 3. The emitter-to-collector path of transistor 9 is coupled in series with emitter load resistor 39 between sources of positive and negative biasing potential. The input potential to impedance-matching transistor 9 is received from the upper plate of storage capacitor 37 at its base electrode.

The output potential of charge-discharge channel 3, developed across the low impedance emitter output circuit of transistor 9, passes via conductor 4 through the single-pole, double-throw contacts 40 of relay 20, and resistor 41 to semiconductor amplifier 15 where it is received at the emitter electrode of transistor 6. The resulting potential fluctuations on the emitter electrode of transistor 6 also occur at a higher impedance level and with the same phase on the collector electrode. The signal potential then passes via conductor 35 to the base electrode of impedance-matching transistor 7 where it undergoes current amplification before being taken, finally, from the emitter electrode to the output terminal 2 as sawtooth output signal $E_o$.

It is the function of the regenerative feedback circuit 5 to shape the sawtooth output signal $E_o$ into a signal of suitable waveform and magnitude for operating transistor switch 8 of the charge-discharge channel 3. The regenerative feedback circuit 5 comprises transistor amplifier 10 having its emitter-to-collector current path coupled in series with collector load resistor 42 between a source of positive potential and a ground source of constant potential, a resistor 43 and capacitor 44 coupled in series between amplifier output terminal 2 and the base electrode of transistor 10, and a capacitor 45 and resistor 46 coupled in series between the collector electrode of transistor 10 and the base electrode of transistor switch 8.

The relay 20 may comprise solenoid coil 47 operative through mechanical linkage 48 to shift the positions of relay contacts 19 and 40, respectively, in response to a control signal.

The operation of the exemplary embodiment will be explained with reference to the curves of Fig. 2. In its first mode of operation the invention functions as a relaxation oscillator. Normally, the circuit via conductor 4 between the output circuit of transistor 9 and the emitter electrode of amplifier stage 15 is completed through relay contacts 40, and the storage capacitor 18 of the feedback loop is coupled to a ground source of constant potential through relay contacts 19, thereby effectively nullifying the integrating function of the amplifier channel. Thus, when relay contacts 40 and 19 are in their normal position, the circuit of Fig. 1 is in its relaxation oscillator configuration, in condition for generating the oscillator output signal $E_o$ of the sawtooth waveform.

Assume that the transistor switch 8 has been opened after discharging an accumulated electrical charge from storage ecapacitor 37. At the instant the transistor switch 8 opens, the storage capacitor 37 begins to accumulate a new charge at a rate determined by the R-C time constant established primarily by its series connection through resistor 38 to the source of positive potential. The resistance of the emitter-to-base path of transistor 9 in series with output resistor 39 also contributes to the resistance factor in establishing the charging time of storage capacitor 37 and should be taken into consideration whenever required by the design parameters of the circuit.

As the storage capacitor 37 charges, the potential on the base electrode of transistor 9 becomes increasingly positive, thereby increasing the flow of electron current between emitter and collector and causing the potential on the emitter electrode also to become positive. The increasing current flow through the emitter electrode of transistor 9, therefore, develops a positive potential on the emitter electrode of amplifier stage 15. This positive potential then appears without phase change at a higher impedance level on the collector electrode of transistor 6, from whence it passes to the base electrode of transistor 7 of impedance-matching stage 16 where it undergoes current amplification and appears as a linearly rising portion of the sawtooth waveform of output signal $E_o$.

A portion of the rising potential on amplifier output terminal 2 is fed back regeneratively via feedback circuit 5 to initiate the discharge of storage capacitor 37 by closing the transistor switch 8 at the end of the charging interval. This feedback potential passes via conductor 41 and the resistance-capacitance coupling 43—44 to the base electrode of transistor amplifier 10. As it reaches the resistor 43 of the differentiator network the waveform of the feedback potential is essentially the same as that represented by the curve of 49 and curve A of Fig. 2. After modification in the differentiator network 43—44—10, the wave is transformed and may have a shape somewhat as idealized by waveform 50 and by waveform B of Fig. 2. Upon amplification by transistor 10, the waveform is inverted and may have a shape as idealized by waveform 51 and waveform C of Fig. 2. From the collector electrode of transistor 10, the waveform 51 of the signal undergoes further modification by differentiator network 45—46—8 and at the base electrode of transistor switch 8 has a form somewhat like that idealized in waveform 52 of Fig. 1 and waveform D of Fig. 2.

The base electrode of transistor switch 8 normally is biased at a potential somewhat below that required for electron current flow between the emitter and collector electrodes. The maximum negative bias on the base electrode occurs almost immediately after the charging cycle begins. This fact is apparent from an inspection of Fig. 2 wherein the accumulation of electrical charge is shown to begin at time $t_0$ in curve A, while at this same instant, or almost immediately thereafter, the potential on the base electrode of transistor 8, represented in curve D, is at its maximum negative amplitude. As charge accumulates in storage capacitor 37 and $E_o$ becomes increasingly more positive, the waveform transformations 50 and 51 (B and C of Fig. 2) occurs in the feedback circuit 5 and eventually appear as waveform 52 (D of Fig. 2) at the base electrode of transistor switch 8. As indicated by waveform D, the potential applied to the base electrode 8 becomes increasingly less negative as $E_o$ becomes increasingly more positive until a point is reached where the potential on the base electrode of the switch no longer cuts off electron current in its emitter-to-collector path. The closing of transistor switch 8 also is aided by the increasingly positive potential applied to its collector electrode as the charge accumulates in storage capacitor 37. Thus, when the combined effects of the increasingly positive potential of the collector electrode and the positive-going potential bias applied to the base electrode are sufficient, the switch closes at time $t_1$ (Fig. 2) and electron current flow occurs through the emitter-to-collector path, thereby starting the discharge of the electrical charge accumulated in storage capacitor 37.

As the discharge of storage capacitor 37 begins, the increased electron flow through the emitter-to-collector path of switching transistor 8 causes the base electrode of transistor 9 to become more negative. This negative-going potential on the base electrode of transistor 9 passes through semiconductor amplifier 15, impedance-matching stage 16 and, from the amplifier output terminal 2, through the regenerative feedback circuit 5 to the base electrode of transistor switch 8. The effect of the regenerative feedback circuit 5 on the negative-going portion of the feedback potential 49 is represented by waveforms 50, 51, 52 and in waveforms B, C, and D of Fig. 2 between times $t_1$ and $t_2$. As indicated in waveform B, this negative-going potential causes the base electrode of transistor amplifier 10 to go negative very rapidly. At the same time, the waveform C shows the potential on the collector electrode going positive very rapidly. After differentiation by differentiator circuit 45—46—8, the positive-going potential increases, somewhat exponentially, as represented in waveform 52. Thus, after the discharge of storage condenser 37 begins at time $t_1$, the negative-going potential on the collector electrode of transistor switch 8 is fed back to its base electrode as a positive-going potential. The positive-going potential on the base electrode of transistor switch 8 causes current flow through the switch to increase rapidly to maximum. When this condition occurs at time $t_2$, the potential on the collector electrode of transistor switch 8 is momentarily constant. At this instant, the collector electrode ceases to become more negative and, in the absence of the negative-going feedback signal, the normal biasing circuitry on the base electrode of transistor switch 8 becomes predominant, driving the base electrode more negative and, as the result of regenerative feedback, opening transistor switch 8 almost instantaneously. This action is represented by the steep slope of curve D at time $t_2$ (Fig. 2). At the instant transistor switch 8 is opened, the storage capacitor 37 begins charging again and the charge-discharge cycle is repeated.

In the second mode of operation, the exemplary embodiment of Fig. 1 functions as an integrator characterized by a time constant of comparatively long duration. A control signal $E_c$ actuates relay 20, thereby operating contacts 40 to interrupt the circuit via conductor 4 between impedance-matching transistor 9 and semiconductor amplifier 15, and positioning relay contacts 19 such that storage capacitor 18 is disconnected from ground and coupled to the input terminal 1 of the amplifier channel. The operation of relay contacts 40 and 19 put the circuit of Fig. 1 in its integrator configuration whereby an input signal of unidirectional potential, applied to input terminal 1, is integrated. An input signal applied to input terminal 1 is converted into a 400-cycle A.-C. signal by chopper 53 energized electromagnetically, for example, by coil 22 coupled between a source of 400-cycle alternating-current voltage and a ground source of constant potential. The resulting A.-C. signal then passes into tracking amplifier 11 at input terminal 23 where it is amplified to a usable amplitude. As explained hereinbefore, the tracking amplifier 11 may comprise one or more semiconductor amplifier stages electromagnetically coupled and tuned to the 400-cycle signal frequency. After suitable amplification in tracking amplifier 11, the signal passes from output terminal 24 through primary winding 25 of output transformer 12. The secondary winding 27 of the output transformer is coupled in series with chopper 13 between the input of filter 14 and a ground source of constant potential such that the signal induced therein undergoes half-wave rectification and enters filter 14 as a fluctuating unidirectional potential. As shown in Fig. 1, the chopper 13 may constitute a second section of chopper 53 and likewise may be driven electromagnetically by coil 22.

In filter 14, the fluctuating unidirectional signal potential is smoothed before passing to the base electrode of transistor 6 of semiconductor amplifier stage 15. After amplification therein, the unidirectional output signal derived at the collector electrode passes to the base electrode of transistor 7 in the impedance-matching stage 16. The output signal of the amplifier channel, developed across emitter resistor 36 of transistor 7 passes to output terminal 2. The amplifier channel, as thus described, is caused to operate as a Miller-type integrator by providing a degenerative feedback loop made up of conductor 17 and storage capacitor 18 coupled between output terminal 2 and input terminal 1.

From the foregoing description of the structure and operation of an exemplary embodiment of the invention, it should be apparent that a simple, light weight, and reliable relaxation oscillator integrator is provided whereby, in the absence of a control signal $E_c$, the circuit has a first configuration wherein it operates as a relaxation oscillator, and, in response to control signal $E_c$, the circuit assumes a second configuration wherein it operates as a Miller-type integrator.

The details illustrated in the accompanying drawings and set forth in the foregoing description are intended merely to facilitate the practice of the invention by persons skilled in the art. The scope of the invention is represented in the following claims.

What is claimed is:

1. A relaxation oscillator-integrator comprising: an amplifier channel having input and output terminals; a degenerative feedback channel coupled between the said output and input terminals; said feedback channel including a first capacitance means coupled in series between said output terminal and said input terminal; a second capacitance means coupled to said amplifier channel during a first mode of operation for accumulating an electrical charge; means coupled to said output terminal and to said second capacitance means and responsive to the potential developed at the said output terminal for discharging the said second capacitance means at the end of a charging interval during said first mode of operation; and means responsive to a control signal for disabling the said feedback channel and coupling the said second capacitance means to the said amplifier channel during said first mode of operation, and for enabling the said feedback channel and decoupling the said second capacitance means from the said amplifier channel during a second mode of operation.

2. A relaxation oscillator-integrator comprising: an amplifier channel having input and output terminals; a first feedback channel including an electrical-charge storage element serially coupled between the said output and input terminals; an electrical charge-discharge circuit switchably coupled to said amplifier channel for accumulating an electrical charge and then releasing an electrical charge in response to a discharge signal to produce a sawtooth type voltage during a first mode of operation; a second feedback channel coupled between the said output terminal and the said charge-discharge circuit for converting a portion of the potential present on the said output terminal into the said discharge signal during said first mode of operation; and means responsive to control signal for disabling the said first feedback channel and coupling the said charge-discharge circuit to the said amplifier during said first mode of operation, and for enabling the said first feedback channel and decoupling the said charge-discharge circuit from the said amplifier channel during a second mode of operation.

3. A relaxation oscillator-integrator as represented in claim 2 wherein the said amplifier channel comprises a first chopper coupled to the said input terminal to convert a direct-current input signal into an alternating-current signal; a tracking amplifier coupled to the said chopper tuned to the frequency of the said alternating-current signal; a second chopper coupled to the said tracking amplifier for rectifying the said alternating-current signal to produce a direct-current signal; a filter coupled to the said second chopper for smoothing the said direct-current signal; a first semiconductor amplifier coupled to the said filter; and a first semiconductor impedance-matching stage coupled between the said first semiconductor amplifier and the said output signal.

4. A relaxation oscillator-integrator as represented in claim 3 wherein the said electrical charge-discharge circuit comprises: means for accumulating an electrical charge; means responsive to a discharge potential to provide a conductive path to a source of constant reference potential for discharging the accumulated electrical charge at the end of charging intervals; and a second impedance-matching stage coupled between the said charge-accumulating means and the said first semiconductor amplifier.

5. A relaxation oscillator-integrator as represented in claim 4 wherein the said discharging means comprises a semiconductor switch coupled between the said charge-accumulating means and said source of constant reference potential.

6. A relaxation oscillator-integrator as represented in claim 2 wherein the said second feedback channel comprises: a first means for differentiation including a semiconductor amplifier coupled to the said amplifier output terminal; and a second means for differentiation coupled between the said second amplifier and the said discharging means.

7. In a composite relaxation oscillator-integrator circuit, a relaxation oscillator comprising: first means for accumulating an electrical charge; second means coupled to the said first means and responsive to a discharge potential for discharging an electrical charge accumulated by the said first means; a first semiconductor amplifier coupled to the said first means; a first semiconductor impedance-matching stage coupled to the said first amplifier; means for deriving an output signal from the said first semiconductor impedance matching stage; and a regenerative feedback circuit coupled between the said output-signal deriving means and the said second means, the said feedback circuit including a second semiconductor amplifier, a first differentiator coupled between the said output-signal deriving means and the said second amplifier, and a second differentiator coupled between the said second amplifier and the said second means, whereby a portion of the said output signal is utilized to develop the said discharge potential required to discharge the accumulated electrical charge of the said first means through the said second means, thereby causing the said output signal to have an oscillatory waveform and establishing self-controlled repetitive charge-discharge cycles of operation of the said first means.

8. A relaxation oscillator circuit as represented in claim 7 wherein the said second means is an electronic switch.

9. A relaxation oscillator circuit as represented in claim 8 wherein the said electronic switch comprises a semiconductor having at least one current path normally biased in the cutoff region.

10. A relaxation oscillator as represented in claim 7 further comprising a second semiconductor impedance-matching stage coupled between the said first means and the said first amplifier.

References Cited in the file of this patent

UNITED STATES PATENTS

| | | |
|---|---|---|
| 2,287,925 | White | Jan. 30, 1942 |
| 2,729,766 | Vilkomerson | Jan. 3, 1956 |
| 2,801,296 | Blecher | July 30, 1957 |
| 2,820,922 | Fathauer | Jan. 21, 1958 |